US010722988B2

(12) United States Patent
Inoue et al.

(10) Patent No.: US 10,722,988 B2
(45) Date of Patent: Jul. 28, 2020

(54) WORKPIECE SUPPORT DEVICE INCLUDING ROTATABLE WORK TABLE

(71) Applicant: FANUC CORPORATION, Minamitsuru-gun, Yamanashi (JP)

(72) Inventors: Toshihiko Inoue, Yamanashi (JP); Tomoyuki Motokado, Yamanashi (JP); Tooru Nagai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 42 days.

(21) Appl. No.: 16/117,692

(22) Filed: Aug. 30, 2018

(65) Prior Publication Data

US 2019/0076968 A1    Mar. 14, 2019

(30) Foreign Application Priority Data

Sep. 8, 2017  (JP) ................. 2017-173409

(51) Int. Cl.
*B23K 37/04* (2006.01)
*B23K 37/047* (2006.01)

(52) U.S. Cl.
CPC ........ *B23K 37/0461* (2013.01); *B23K 37/047* (2013.01)

(58) Field of Classification Search
CPC .......................... B23K 37/0461; B23K 37/047
See application file for complete search history.

(56) References Cited

U.S. PATENT DOCUMENTS

| 3,788,610 | A | 1/1974 | Buelow et al. | |
| 6,239,408 | B1 * | 5/2001 | Takahashi | B23K 9/323 |
| | | | | 219/125.11 |
| 8,878,061 | B2 * | 11/2014 | Nakano | H02G 11/00 |
| | | | | 174/47 |
| 2015/0367470 | A1 * | 12/2015 | Tezuka | B23Q 1/522 |
| | | | | 269/55 |

FOREIGN PATENT DOCUMENTS

| CN | 201002168 Y | 1/2008 |
| CN | 103659129 A | 3/2014 |
| CN | 106624276 A | 5/2017 |
| DE | 2332184 A1 | 1/1974 |
| DE | 69924328 T2 | 3/2006 |
| DE | 102013204426 A1 | 9/2014 |
| EP | 0979705 A2 | 2/2000 |
| GB | 567197 A | 2/1945 |
| JP | S48014648 Y | 4/1973 |
| JP | S62221510 A | 9/1987 |
| JP | H05000276 U | 1/1993 |
| JP | 08047796 A | 2/1996 |

(Continued)

*Primary Examiner* — Tu B Hoang
*Assistant Examiner* — Erin E McGrath
(74) *Attorney, Agent, or Firm* — RatnerPrestia

(57) ABSTRACT

A work table support device capable of adapting to a plurality of applications. The workpiece support device includes a base; a conductive work table rotatably supported on the base; a current-collecting brush that is fixed to the base, slidably contacts an end face of the work table, and supplies electric power to work table, and a cover that is removably attached to the base, surrounds the current-collecting brush and the end face, and includes cover segments that can be assembled and disassembled one another.

12 Claims, 14 Drawing Sheets

(56) References Cited

FOREIGN PATENT DOCUMENTS

| | | |
|---|---|---|
| JP | 2000015446 A | 1/2000 |
| JP | 2010-036231 A | 2/2010 |
| JP | 2010082622 A | 4/2010 |
| JP | 2012250241 A | 12/2012 |
| WO | 2006001146 A1 | 1/2006 |

* cited by examiner

WORKPIECE SUPPORT DEVICE INCLUDING ROTATABLE WORK TABLE

CROSS-REFERENCE TO RELATED APPLICATION

This application is a new U.S. Patent Application that claims benefit of Japanese Patent Application No. 2017-173409, filed Sep. 8, 2017, the disclosure of this application is being incorporated herein by reference in its entirety for all purposes.

BACKGROUND OF THE INVENTION

1. Technical Field

The invention relates to a workpiece support device including a rotatable work table.

2. Background Art

A workpiece support device for rotating a workpiece when the workpiece is arc-welded by an arc-welding robot is known (e.g., Japanese Unexamined Patent Publication (Kokai) No. 2010-036231).

Arc welding includes a use application (hereinafter referred to as "continuous rotation application") in which the workpiece is continuously rotated (e.g., one rotation or more) and a use application (hereinafter referred to as "non-continuous rotation application") in which by reversely rotating the workpiece to an original position, each time the workpiece is rotated by a certain angle (e.g., 360 degrees or less), the workpiece is not continuously rotated. The workpiece support device that can flexibly cope with to these use applications is demanded.

SUMMARY OF INVENTION

In an aspect of the present disclosure, the workpiece support device includes a base; a conductive work table rotatably supported by the base and includes a first end face that supports the workpiece and a second end face opposite the first end face; a removable current-collecting brush fixed relative to the base, and slidably contacting the second end face to supply electric power to the work table; and a cover removably attached to the base, and surrounds the current-collecting brush and the second end face, the cover including a plurality of cover segments that can be assembled and disassembled one another.

According to the present disclosure, since the cover segments can be assembled and disassembled, depending on the use application of the workpiece support device, the cover can be retrofitted and removed. Therefore, it is possible to flexibly cope with both the continuous rotation application and the non-continuous rotation application.

DETAILED DESCRIPTION

Figure 1:
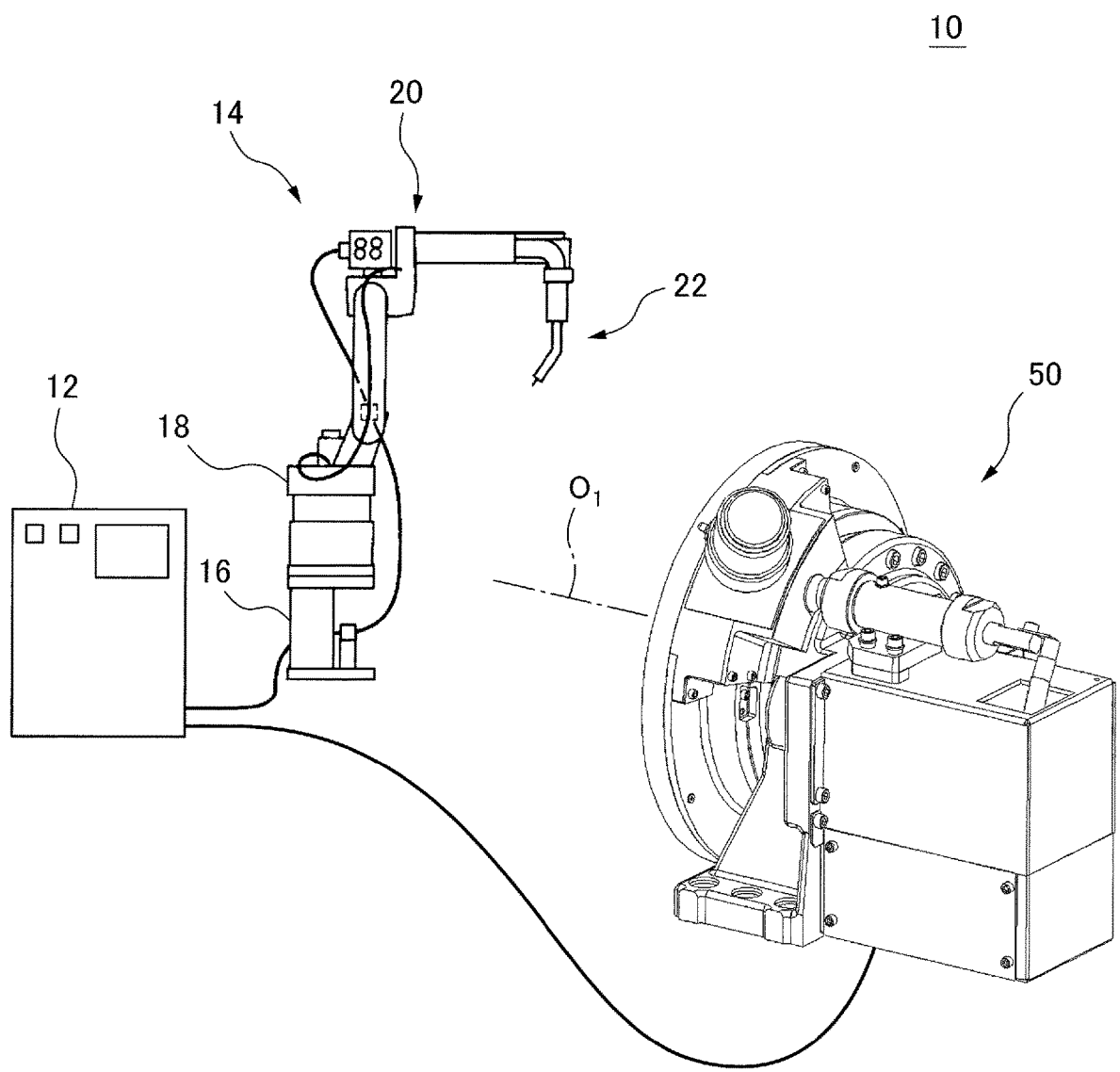
FIG. 1 is a drawing of an arc-welding system according to one embodiment.

Embodiments of the present disclosure are described in detail below with reference to the drawings. Note that, in the various embodiments described below, similar elements are assigned the same reference numerals, and the duplicate explanations thereof will be omitted. First, with reference to FIG. 1, an arc-welding system 10 according to an embodiment is described.

The arc-welding system 10 includes a control device 12, an arc-welding robot 14, and a workpiece support device 50. The control device 12 includes at least one processor and memory (not illustrated), and controls the arc-welding robot 14 and the workpiece support device 50. The arc-welding robot 14 is a vertical articulated robot, and includes a base 16, a turning body 18, a robotic arm 20, and an end effector 22.

A workpiece to be welded (not illustrated) is set on the workpiece support device 50. The workpiece support device 50 rotates the workpiece around a rotational axis $O_1$ in accordance with a command from the control device 12.

The control device 12 operates the arc-welding robot 14 to arc-weld the workpiece by the end effector 22, while operating the workpiece support device 50 to rotate the workpiece.

Next, with reference to FIG. 2 to FIG. 9, the workpiece support device 50 is described. Note that, in the following description, an orthogonal coordinate system in the drawings is used as a standard of direction, wherein the x-axis positive direction is referred to as the rightward direction, the y-axis positive direction referred to as the frontward direction, and the z-axis positive direction is referred to as the upward direction, for the sake of convenience. In this embodiment, a y-axis direction is parallel to the rotational axis $O_1$.

Further, in the following description, the axial direction indicates the direction of the rotational axis $O_1$ of the work table, the radial direction indicates the radial direction of a circle centered about the rotational axis $O_1$, and the circumferential direction indicates the circumferential direction of the circle (i.e., the direction around the rotational axis $O_1$).

The workpiece support device 50 includes a base 52, a motor housing 54, a power supply mechanism 56, a current-collecting brush 58 (FIG. 5 to FIG. 8), a reduction gear device 60, and a work table 62. The base 52 includes a base portion 64 and an annular portion 66. The base portion 64 is fixed on a floor of a work cell. The annular portion 66 is fixed to an upper side of the base portion 64.

The motor housing 54 is a square pillar-shaped hollow member, and is fixed to a rear side of the base 52. The motor housing 54 houses a motor (not illustrated) therein. The motor generates power for rotating the work table 62 in accordance with a command from the above-described control device 12.

Figure 5:
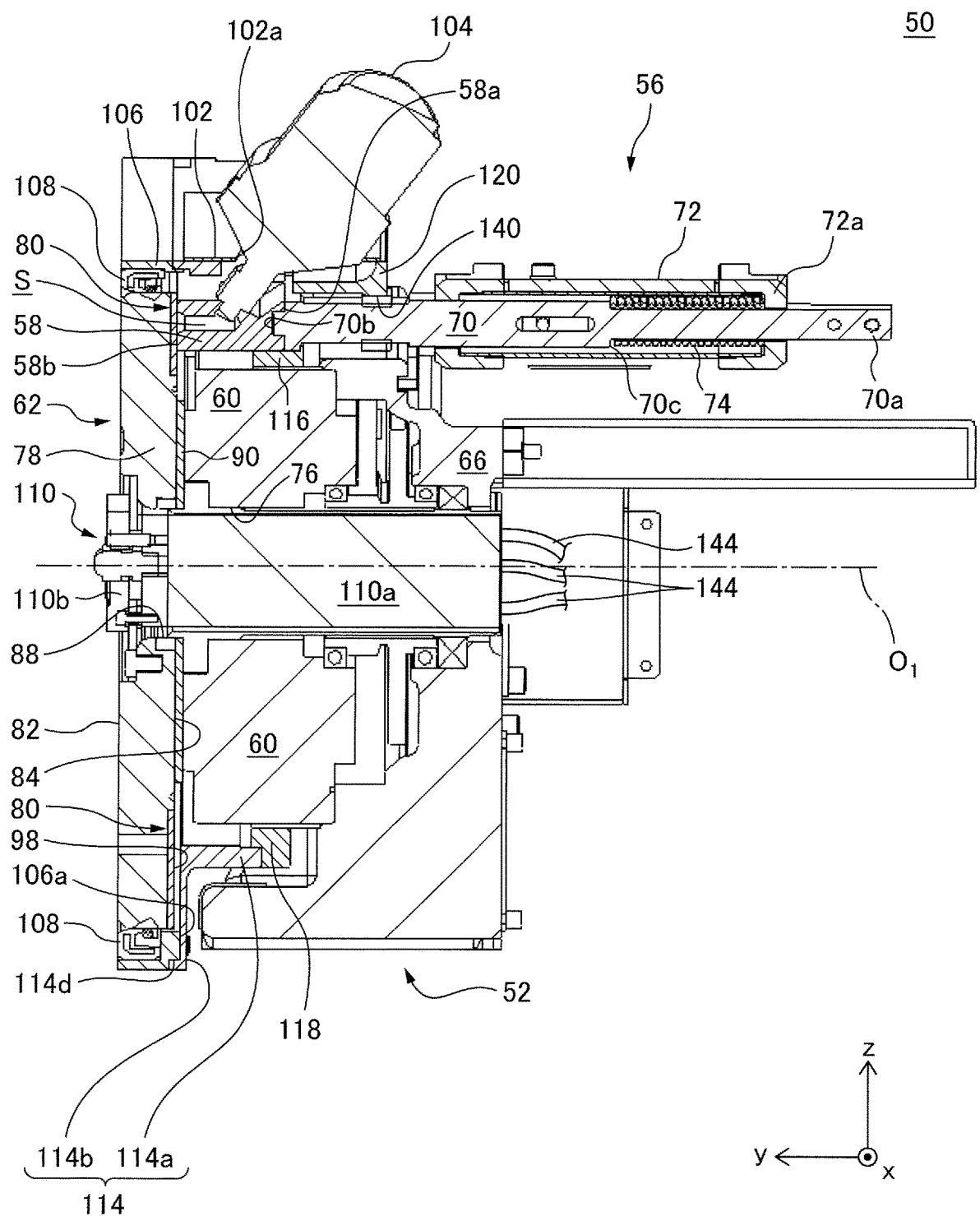
FIG. 5 is a cross-sectional view of a workpiece support device illustrated in FIG. 2 taken along a plane that passes a current-collecting brush.

The power supply mechanism 56 includes a first power supply shaft 68, a second power supply shaft 70, a cylinder 72, and a spring 74 (FIG. 5). A proximal end of the first power supply shaft 68 is electrically connected to a terminal 75 provided at the motor housing 54, while a distal end of the first power supply shaft is connected to a rear end 70a of the second power supply shaft 70. The first power supply shaft 68 extends out from an opening 54a formed at the motor housing 54.

As illustrated in FIG. 5, the second power supply shaft 70 extends in the y-axis direction, and a front end 70b thereof is fitted to a rear end 58a of the current-collecting brush 58. In this way, the terminal 75, the first power supply shaft 68, the second power supply shaft 70, and the current-collecting brush 58 electrically conduct with each other. The cylinder 72 receives the second power supply shaft 70 therein so as to be slidable in the y-axis direction.

The spring 74 is arranged inside of the cylinder 72. Specifically, the spring 74 is interposed between a rear wall 72a of the cylinder 72 and a step portion 70c formed at the second power supply shaft 70, and urges the second power supply shaft 70 to frontward.

By urging force of the spring 74, the front end 70b of the second power supply shaft 70 is pressed against the rear end 58a of the current-collecting brush 58. Thereby, the second power supply shaft 70 and the current-collecting brush 58 can surely be in conductive-contact with each other.

The current-collecting brush 58 is removably attached to the second power supply shaft 70 in an insulated state, such that the current-collecting brush 58 is immovable with respect to the base 52. The current-collecting brush 58 is conductive, and a front end 58b thereof is in conductive-contact with a rear end face 98 (second end face) of the work table 62. The rear end face 98 will be described later. The current-collecting brush 58 is configured from e.g. a brass.

Figure 4:
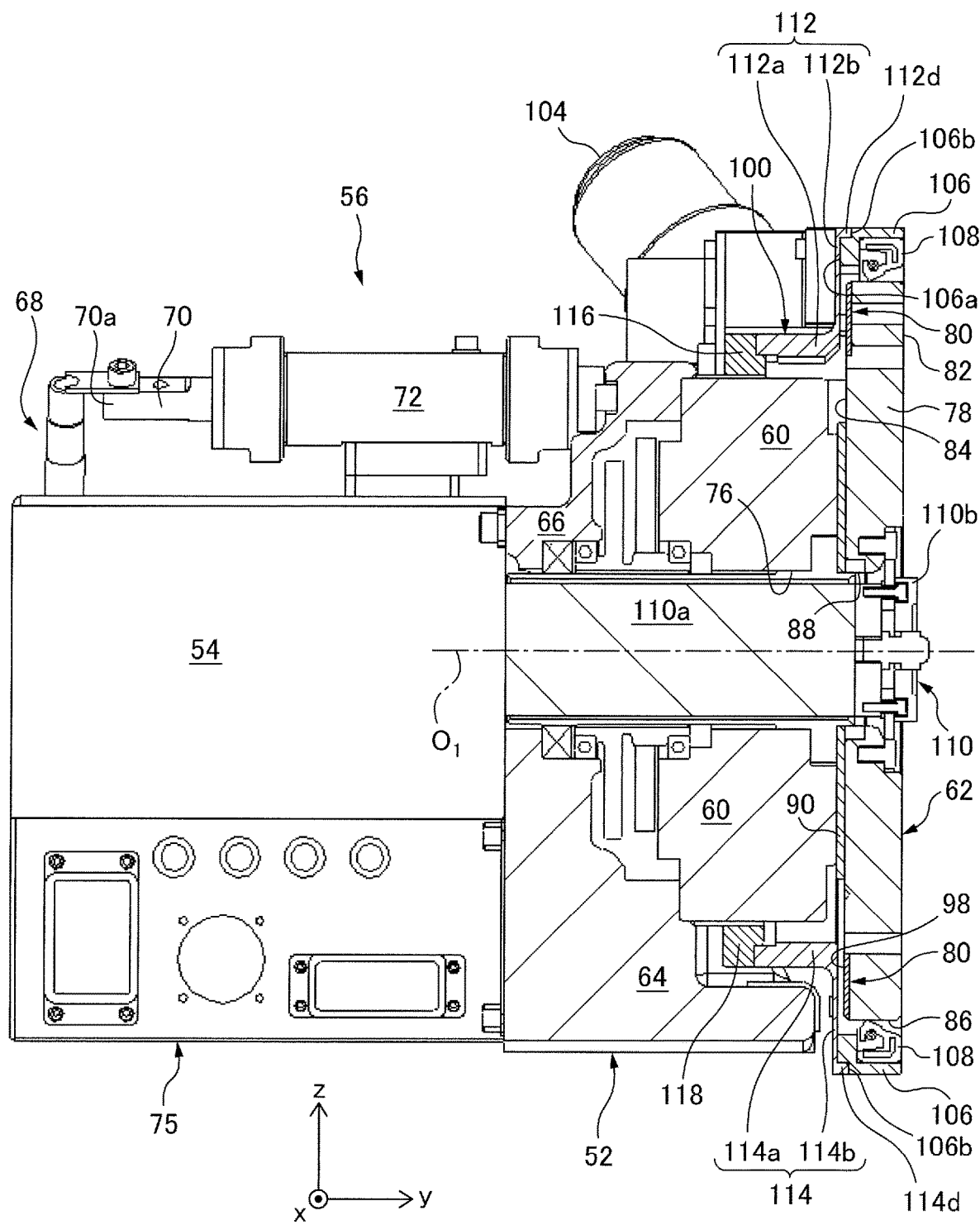
FIG. 4 is a cross-sectional view of a workpiece support device illustrated in FIG. 2 taken along a y-z plane in the drawing.

The reduction gear device 60 is arranged radially inside of the current-collecting brush 58. As illustrated in FIG. 4 and FIG. 5, the reduction gear device 60 is cylindrical, and has a hollow portion 76 at the center thereof. The reduction gear device 60 is fixed to the annular portion 66 of the base 52, and arranged to be centered about the rotational axis $O_1$.

The reduction gear device 60 includes e.g. a multi-stage gear mechanism, and an input stage thereof is mechanically connected to an output shaft of the motor housed in the motor housing 54, while an output stage thereof is connected to the work table 62.

Rotation force generated by rotating the output shaft of the motor housed in the motor housing 54 is transmitted from the output shaft to the reduction gear device 60, where a rotational speed thereof is decelerated, and then transmitted to the work table 62. In this way, the work table 62 is rotated by the motor housed in the motor housing 54.

Figure 6:
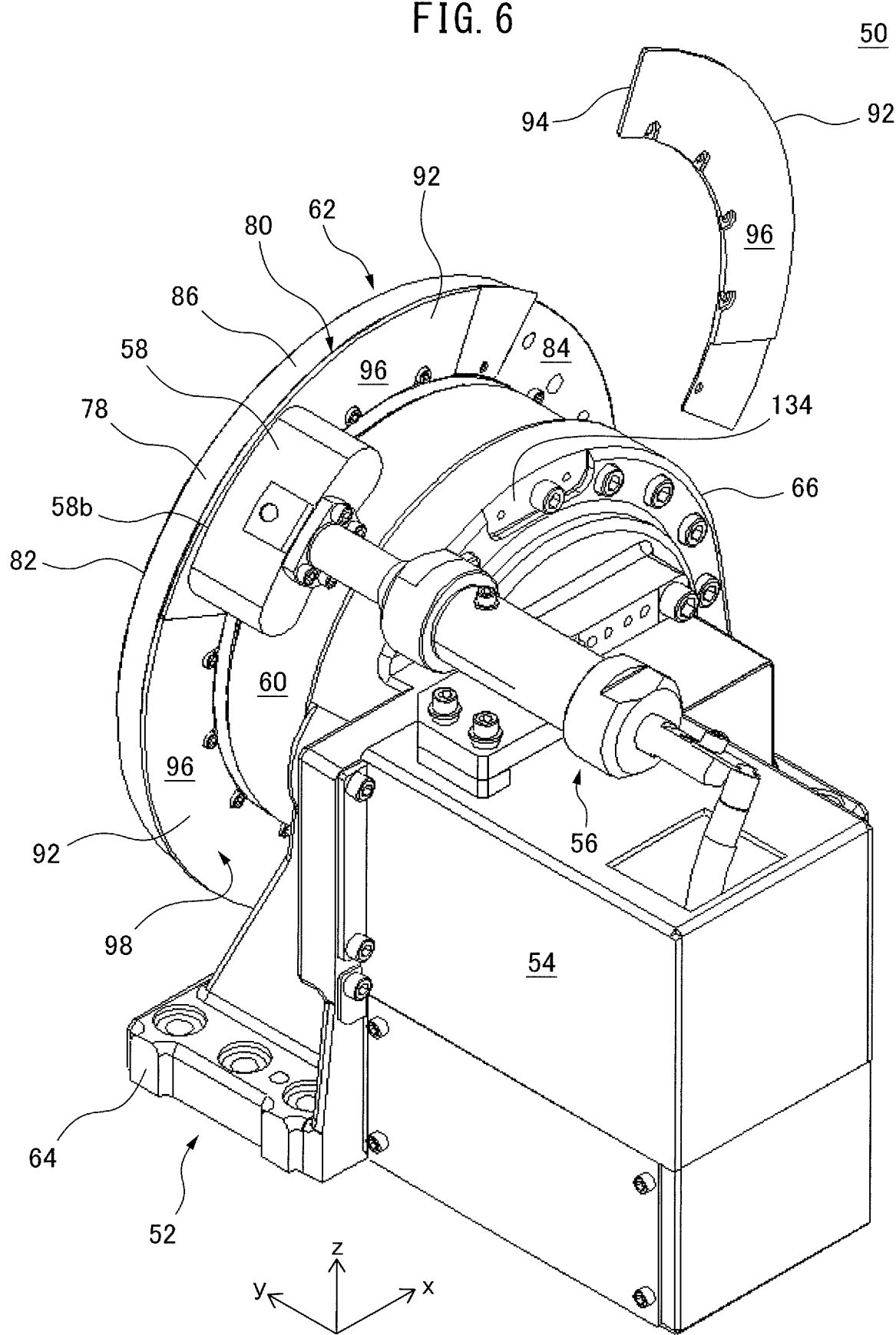
FIG. 6 is a perspective view obtained by omitting a cover, a grease cup, and an oil seal housing from a workpiece support device illustrated in FIG. 2 and illustrates a state in which one of ring segments of a current-collecting ring is disassembled.

The work table 62 is supported by the base 52 so as to be rotatable around the rotational axis $O_1$. As illustrated in FIG. 4 to FIG. 6, the work table 62 includes a table body 78 and a current-collecting ring 80.

The table body 78 is a conductive annular member, and includes a front end face (first end face) 82, a rear end face 84 opposite the front end face 82, an outer peripheral surface 86 extending between the front end face 82 and the rear end face 84, and a center hole 88 penetrating the table body 78 in the axial direction.

The front end face 82 and the rear end face 84 are planes parallel to each other. The front end face 82 defines a front end face of the work table 62. A jig (not illustrated) is installed on the front end face 82, and the workpiece to be welded is clamped to the jig. In this way, the workpiece is supported by the front end face 82 via the jig.

The output stage of the above-described reduction gear device 60 is connected to the rear end face 84 of the table body 78. An insulation ring 90 is interposed between the rear end face 84 and the reduction gear device 60. The insulation ring 90 electrically insulates the work table 62 from the reduction gear device 60.

The current-collecting ring 80 is fixed to the rear end face 84 of the table body 78, and arranged adjacent to the outer peripheral surface 86 of the table body 78. As illustrated in FIG. 6, the current-collecting ring 80 includes a total of four ring segments 92 arranged so as to align in the circumferential direction.

FIG. 6 illustrates a state in which, one ring segment 92 arranged at an upper-right side is disassembled from the table body 78. Further, in FIG. 6, one ring segment 92 arranged at the lower-right side is not illustrated.

Each ring segment 92 is an arc-shaped conductive flat plate (e.g., iron), and includes a front end face 94 and a rear end face 96 opposite the front end face 94. In this embodiment, each ring segment 92 is removably attached to the rear end face 84 of the table body 78 via a fastener (not illustrated) such as bolt.

When the total of four ring segments 92 are attached to the rear end face 84 of the table body 78, the rear end faces 96 of the ring segments 92 are continuous in the circumferential direction so as to define a rear end face 98 (second end face) of the current-collecting ring 80. The rear end face 98 is an annular plane extending in the circumferential direction. The rear end face 98 defines a part of the rear end face of the work table 62.

The front end 58b of the above-described current-collecting brush 58 contacts the rear end face 98 of the current-collecting ring 80 so as to be slidable relative to the rear end face 98. In this way, the current-collecting brush 58 and the current-collecting ring 80 electrically conduct with each other. When the work table 62 is rotated, the front end 58b of the current-collecting brush 58 relatively slides on the rear end face 98 while being in conductive-contact with the rear end face 98 of the current-collecting ring 80.

The electric power, which is supplied to the terminal 75 from an external power supply installed outside of the workpiece support device 50, is supplied to the current-collecting brush 58 through the first power supply shaft 68 and the second power supply shaft 70. Then, the current-collecting brush 58 supplies the electric power to the current-collecting ring 80 through the conductive-contact with the rear end face 98 of the current-collecting ring 80. In this way, the electric power for arc-welding the workpiece to be welded is supplied to the work table 62.

The workpiece support device 50 further includes a cover 100, a lid 102, a grease cup 104, an oil seal housing 106, an oil seal 108 (FIG. 4 and FIG. 5), and a slip ring 110.

The cover 100 is removably attached to the base 52, and surrounds the current-collecting brush 58 and the rear end face 98 of the current-collecting ring 80 from radially outside. The cover 100 has a structure for preventing a foreign matter, such as dust or cutting fluid, from entering the inside (i.e., dust-proof structure or water-proof structure), and seals the current-collecting brush 58 and the rear end face 98 therein.

The cover 100 includes cover segments 112, 114, 116, 118, and 120. Each of the cover segments 112, 114, 116, 118, and 120 is an insulator.

The cover segments 112 and 114 are arranged adjacent to the rear sides of the work table 62 and the oil seal housing 106, and arranged so as to align in the circumferential direction. The cover segments 112 and 114 configure a first group of cover segments.

Figure 8:
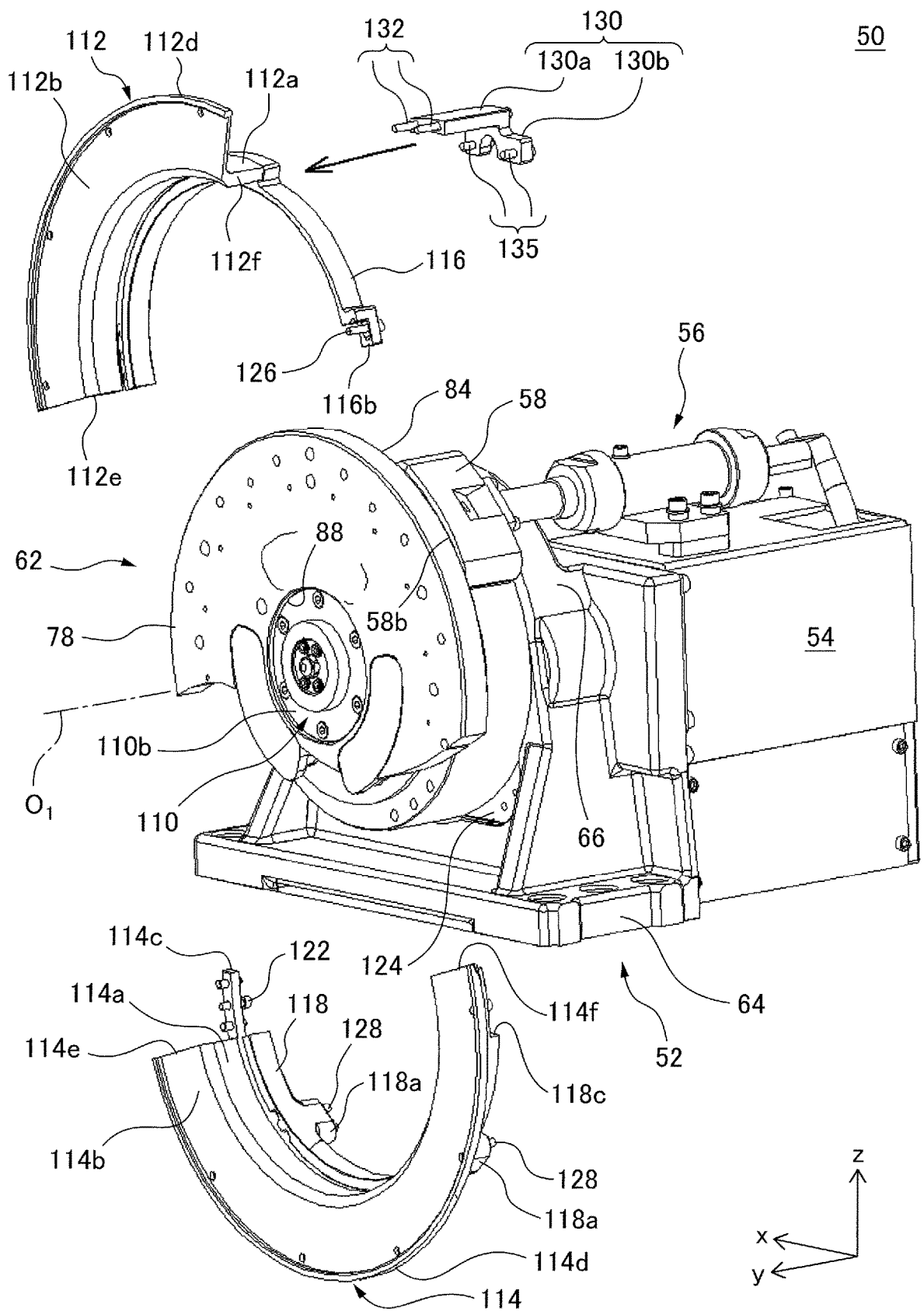
FIG. 8 is an exploded perspective view of a workpiece support device illustrated in FIG. 7 and for ease of understanding, a lower part of the work table is not illustrated.
Figure 9:
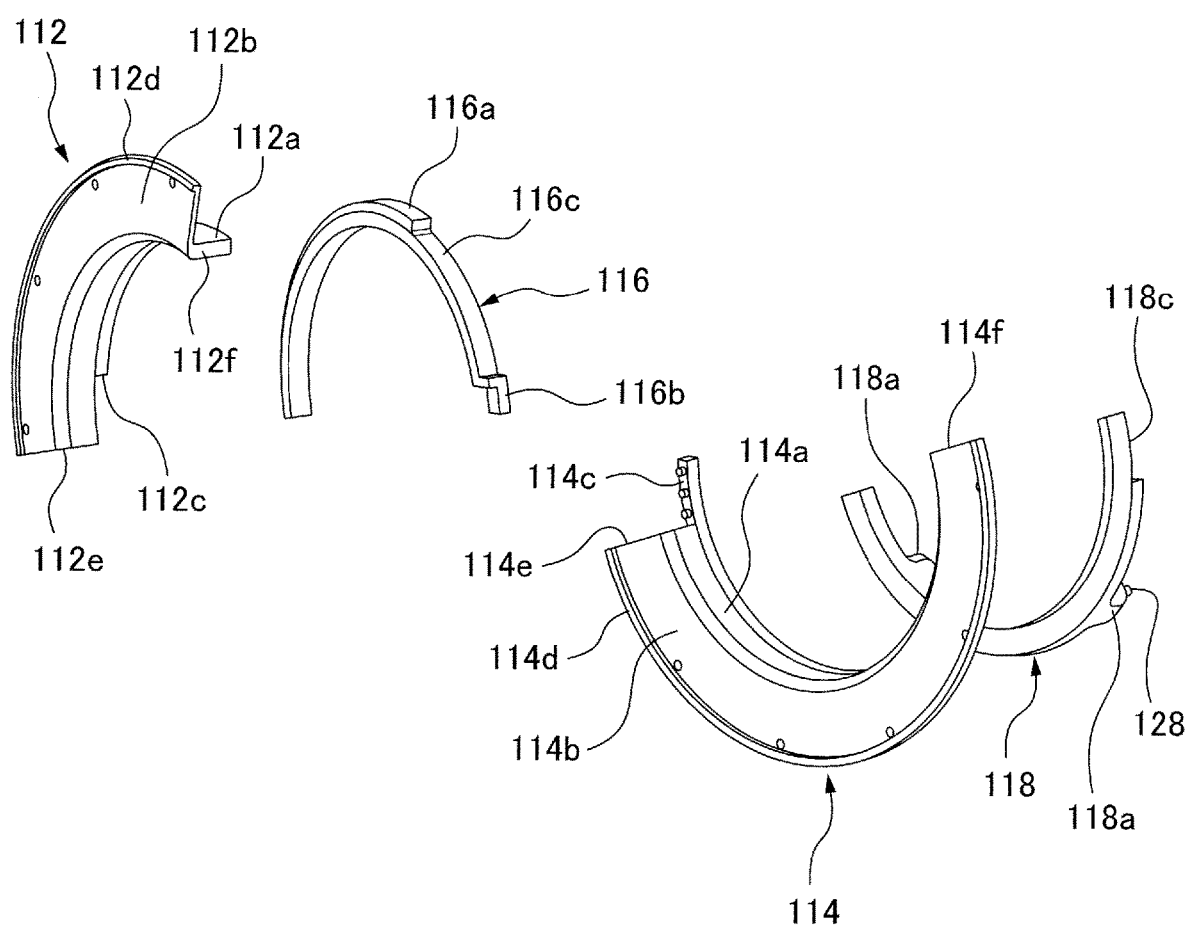
FIG. 9 is an exploded perspective view of a cover segment.

As illustrated in FIG. 8 and FIG. 9, each of the cover segments 112 and 114 is arc-shaped. The cover segment 112 includes a cylindrical wall 112a and a flange wall 112b projecting radially outward from the front end of the cylindrical wall 112a.

The cylindrical wall 112a is adjacent to the radially outside of the reduction gear device 60, and surrounds the reduction gear device 60. A cutout 112c is formed at a circumferential end of the cylindrical wall 112a. A protrusion 112d projecting forward is formed at a radially outer end of the flange wall 112b.

A cover segment 114 is arranged downside of the cover segment 112, and includes a cylindrical wall 114a and a flange wall 114b projecting radially outward from the front end of the cylindrical wall 114a. The cylindrical wall 114a is adjacent to the radially outside of the reduction gear device 60, and surrounds the reduction gear device 60. A convex portion 114c is formed at the circumferential end of the cylindrical wall 114a. A protrusion 114d projecting forward is formed at the radially outer end of the f the flange wall 114b.

The cover segments 112 and 114 are removably connected to each other. Specifically, a circumferential end 112e of the cover segment 112 and a circumferential end 114e of the cover segment 114 contact each other, and the convex portion 114c is fitted into the cutout 112c. In this state, the convex portion 114c is fastened to the cylindrical wall 112a of the cover segment 112 by a fastener 122 (FIG. 8) such as bolt.

Figure 7:
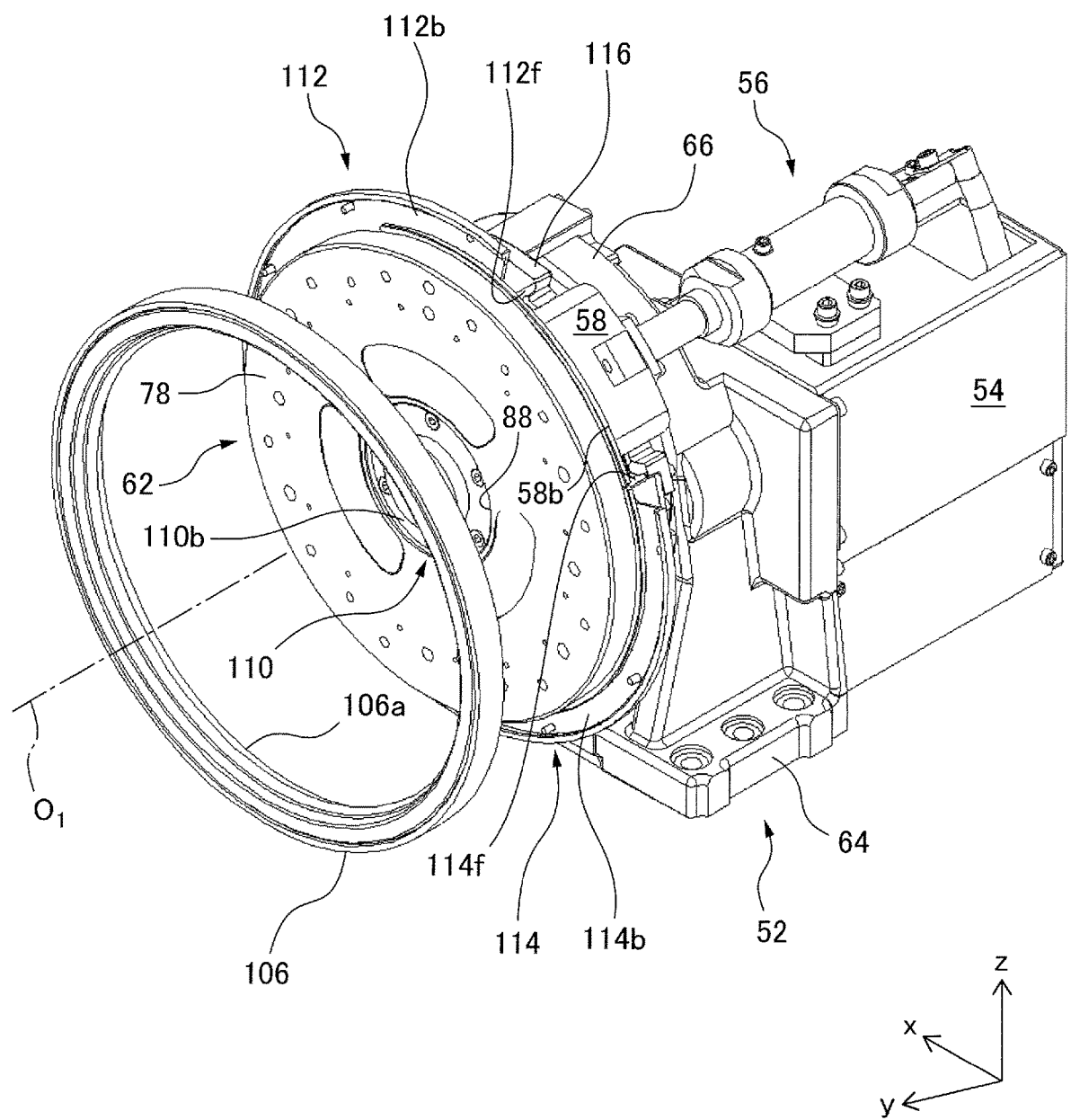
FIG. 7 is a perspective view obtained by omitting a cover and a grease cup from a workpiece support device illustrated in FIG. 2 and illustrates a state in which an oil seal housing is disassembled.

When the cover segments 112 and 114 are thus connected to each other, as illustrated in FIG. 7, a circumferential end 112f of the cover segment 112 and a circumferential end 114f of the cover segment 114 are separated from each other in the circumferential direction, thereby a gap is formed therebetween.

The cover segments 112 and 114 are removably attached to a rear end face 106a of the oil seal housing 106. Specifically, the flange wall 112b of the cover segment 112 and the flange wall 114b of the cover segment 114 are fastened to the rear end face 106a of the oil seal housing 106 by a fastener (not illustrated) such as bolt.

At this time, the protrusions 112d and 114d are fitted into an annular recess 106b formed at a radially outer end of the rear end face 106a of the oil seal housing 106, as illustrated in FIG. 4 and FIG. 5. In this way, the cover segments 112 and 114 are fixed to the rear end face 106a of the oil seal housing 106.

When the cover segments 112 and 114 are fixed to the oil seal housing 106, as illustrated in FIG. 7, the current-collecting brush 58 is arranged in the gap between the circumferential end 112f of the cover segment 112 and the circumferential end 114f of the cover segment 114.

The cover segments 116 and 118 are arranged adjacent to rearward of the cover segments 112 and 114, and are arranged so as to align in the circumferential direction to form a circle. The cover segments 116 and 118 configure a second group of cover segments.

Each of the cover segments 116 and 118 is semicircular. A mount portion 116a is provided at an outer circumference of the cover segment 116, and a concave portion 116c recessed radially inside from the outer peripheral surface of the mount portion 116a is formed at a position adjacent to the mount portion 116a in the circumferential direction. Further, a convex portion 116b is provided at the circumferential end of the cover segment 116.

On the other hand, mount portions 118a are provided at the rear end of the cover segment 118 so as to project rearward. Further, a cutout 118c is provided at the circumferential end of the cover segment 118.

The cover segments 116 and 118 are removably connected to each other. Specifically, both circumferential ends of the cover segment 116 respectively contact both circumferential ends of the cover segment 118, and the convex portion 116b is fitted into the cutout 118c. In this state, the convex portion 116b is fastened to the cover segment 118 by a fastener 126 (FIG. 8) such as bolt.

The cover segments 116 and 118 are removably attached to the front end of the base 52. Specifically, as illustrated in FIG. 8, concave portions 124, which respectively correspond to the mount portions 118a of the cover segment 118, are formed at the front end of the base 52. The concave portions 124 are arranged at positions respectively corresponding to those of the mount portions 118a of the cover segments 118.

The mount portions 118a of the cover segment 118 are respectively fitted into the concave portions 124 formed at the front end of the base 52, and fixed to the front end of the base 52 by fasteners 128 (FIG. 8) such as bolt.

When the cover segments 116 and 118 are connected to the base 52 as illustrated in FIG. 7, the concave portion 116c of the cover segment 116 is arranged radially inside of the current-collecting brush 58 so as to pass between the current-collecting brush 58 and the reduction gear device 60.

As illustrated in FIG. 8, the cover segments 112 and 116 are removably connected to each other via an attachment tool 130. The attachment tool 130 includes a first portion 130a extending in the y-axis direction and a second portion 130b projecting downward from the rear end of the first portion 130a.

Fasteners 132 such as bolt are provided at the first portion 130a. By these fasteners 132, the mount portion 116a of the cover segment 116 is connected to the cylindrical wall 112a of the cover segment 112.

On the other hand, the second portion 130b of the attachment tool 130 is fitted into a concave portion 134 (FIG. 6) formed at the rear end of the annular portion 66 of the base 52, and removably connected to the rear end of the annular portion 66 by fasteners 135 such as bolt. In this manner, the cover segments 112 and 116 are connected to each other, and also connected to the base 52, via the attachment tool 130.

Figure 2:
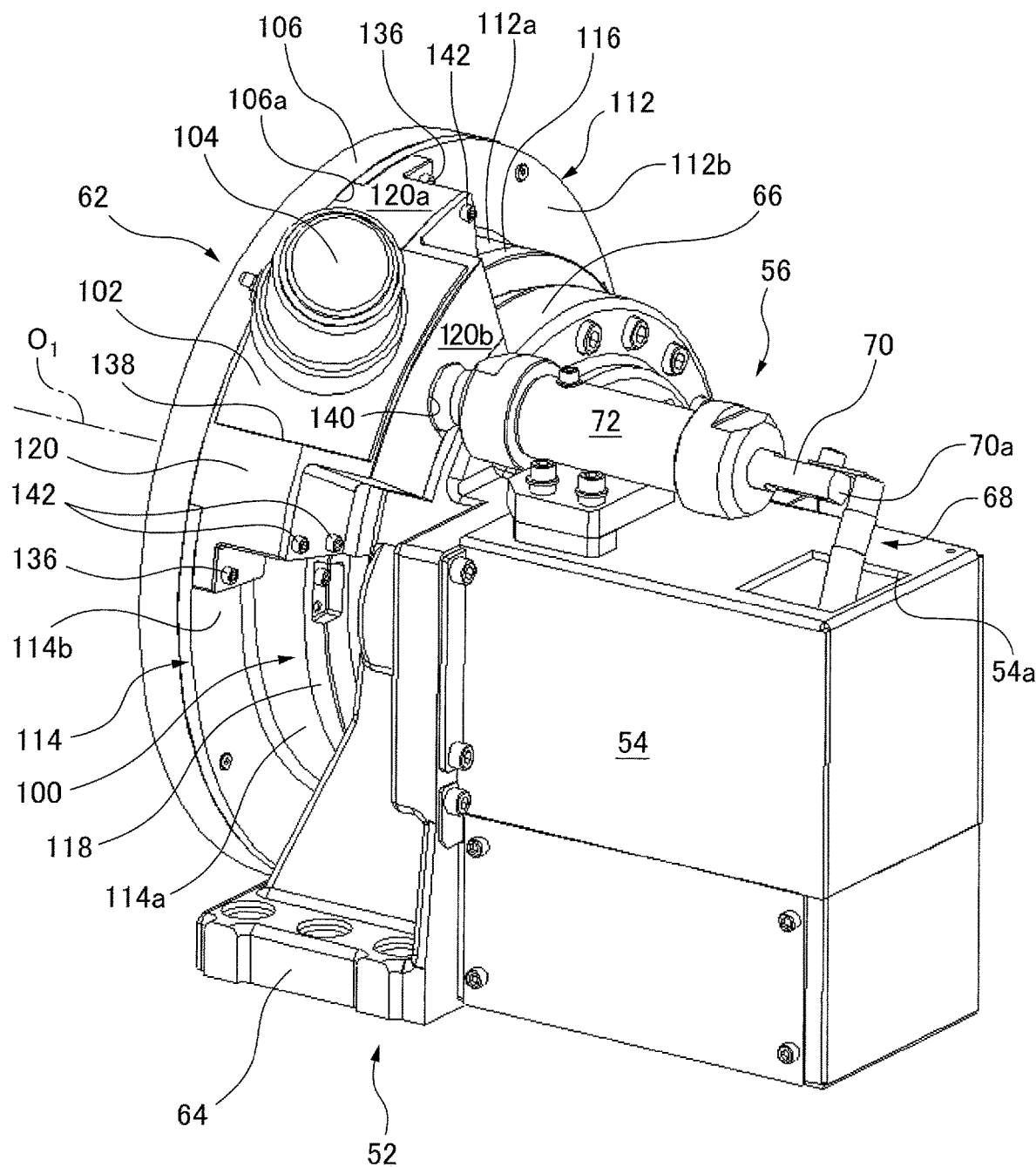
FIG. 2 is a perspective view of a workpiece support device illustrated in FIG. 1.
Figure 2:
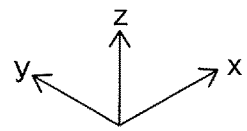
Figure 3:
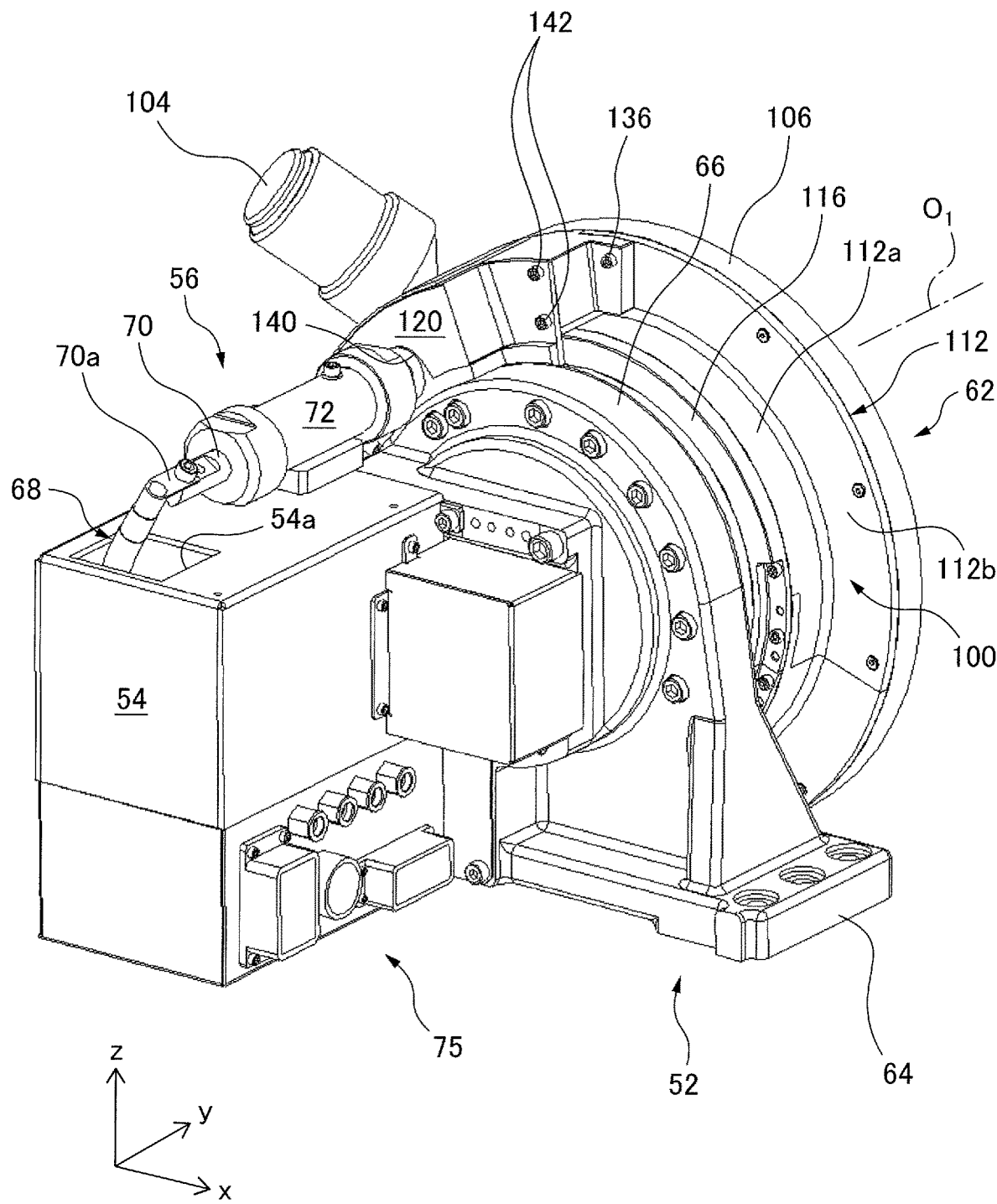
FIG. 3 is a perspective view of a workpiece support device illustrated in FIG. 2.

As illustrated in FIG. 2 and FIG. 3, the cover segment 120 has a substantially sector outer shape as viewed from the y-axis direction, and is arranged between the circumferential end 112f of the cover segment 112 and the circumferential end 114f of the cover segment 114 so as to cover the current-collecting brush 58 from the outside.

The cover segment 120 is attached to the cover segments 112 and 114 by fasteners 136 such as bolt, such that one circumferential end of the cover segment 120 is removably connected to the flange wall 112b of the cover segment 112 by one fastener 136, and the other circumferential end of the cover segment 120 is removably connected to the flange wall 114b of the cover segment 114 by the other fastener 136.

An opening 138 that radially penetrates through the cover segment 120 is formed at the radially outer end of the cover segment 120. The opening 138 allows a user to view the current-collecting brush 58 housed in the cover segment 120 from the outside.

A through hole 140 that penetrates the rear end wall in the y-axis direction is formed at a rear end wall of the cover segment 120. The above-described second power supply shaft 70 is inserted into the through hole 140.

In this embodiment, the cover segment 120 is configured from a plurality of members 120a and 120b that are removably connected to one another. The member 120b is arranged rear side of the member 120a, and is fastened to the member 120a by fasteners 142 such as bolt. The opening 138 is defined by the members 120a and 120b, and the through hole 140 is formed at the member 120b.

In this way, the cover segments 112, 114, 116, 118, and 120 are assembled each other so as to configure the cover 100, and can be disassembled from each other by removing fasteners (122, 126, 128, 132, and 134).

The lid 102 is removably fitted to the opening 138 and closes the opening 138. An opening 102a (FIG. 5) that penetrates the lid 102 is formed at the lid 102. When the user views the current-collecting brush 58 within the cover segment 120, he/she removes the lid 102 from the opening 138. By this, the user can visually recognize e.g. the wearing state of the current-collecting brush 58 and the current-collecting ring 80.

The grease cup 104 is fitted to the opening 102a of the lid 102. The grease cup 104 stores a conductive grease therein, and supplies the grease to internal space S (FIG. 5) of the current-collecting brush 58. By this grease, the relative sliding of the current-collecting brush 58 with respect to the rear end face 98 of the current-collecting ring 80 becomes lubricant.

The oil seal housing 106 is arranged to surround the work table 62 from the outside, and as described above, the oil seal housing 106 can be axially attached to and detached from the flange walls 112b and 114b of the cover segments 112 and 114.

The above-described annular recess 106b is formed at the radially outer end of the rear end face 106a of the oil seal housing 106, and the protrusions 112d and 114d provided at the flange walls 112b and 114b are fitted to the annular recess 106b.

As illustrated in FIG. 4 and FIG. 5, the oil seal 108 is interposed between the work table 62 and the oil seal housing 106, and seals the gap between the work table 62 and the oil seal housing 106.

The oil seal 108 contacts the outer peripheral surface of the work table 62 (i.e., table body 78 and current-collecting ring 80) so as to relatively slide thereon. By the oil seal 108, it is possible to prevent the foreign matter from entering the gap between the work table 62 and the oil seal housing 106.

The slip ring 110 is inserted into the hollow portion 76 of the reduction gear device 60 and the center hole 88 of the work table 62. The slip ring 110 is a rotary joint and includes a fixed portion 110a and a rotary part 110b rotatably connected to the fixed portion 110a.

The fixed portion 110a is inserted to the hollow portion 76 so as to be immovable with respect to the reduction gear device 60, while the rotary part 110b is inserted to the center hole 88 so as to be integrally rotatable together with the work table 62.

A plurality of line members 144 (FIG. 5) are disposed inside the slip ring 110. The line members 144 include e.g. a fluid flow pipe for clamping the workpiece to be welded to the front end face 82 of the work table 62, a signal line for transmitting a control signal for controlling another electronic device.

As described above, in this embodiment, the cover 100 includes the plurality of cover segments 112, 114, 116, 118, and 120 that can be assembled and disassembled one another. According to this configuration, it is possible to flexibly adapt to both the continuous rotation application and the non-continuous rotation application. This function is described below.

In the case of the continuous rotation application, it is necessary to continuously supply electric power for arc-welding to the rotating work table 62. Therefore, the annular rear end face 98 of the work table 62 and the current-collecting brush 58 that slidably contacts the rear end face 98 are necessary. In this case, in order to prevent foreign matters, such as dust or cutting fluid, from adhering to the contact portion between the rear end face 98 and the current-collecting brush 58, the cover 100 for sealing the rear end face 98 and the current-collecting brush 58 is necessary.

Figure 10:
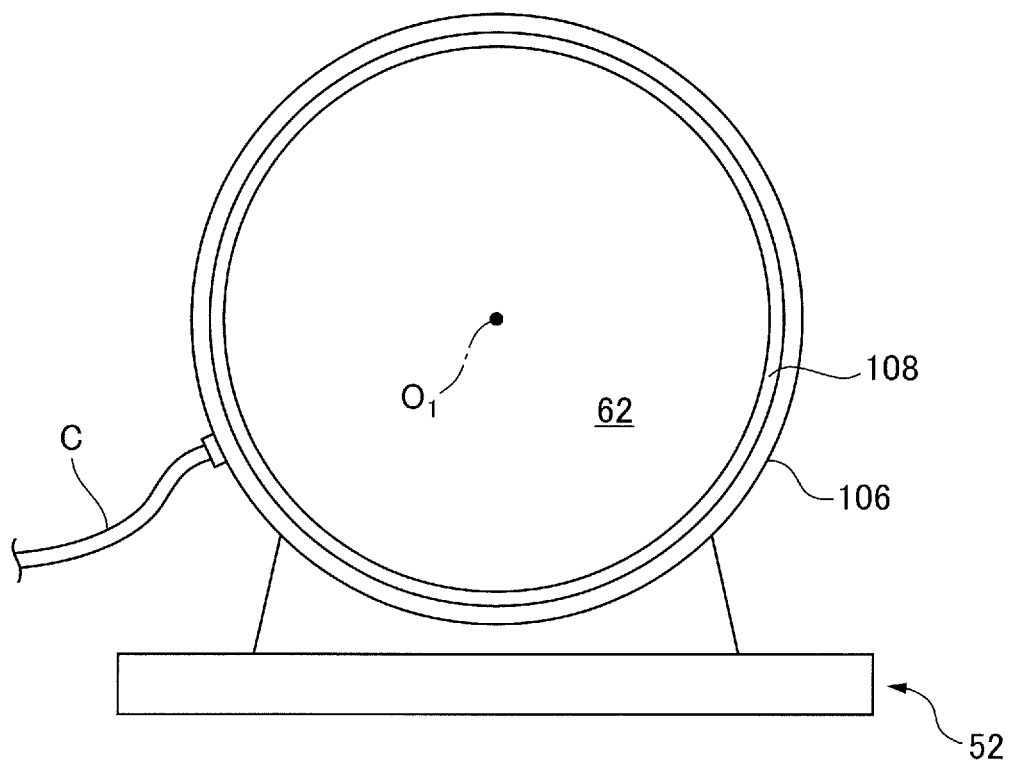
FIG. 10 illustrates a state in which a current-collecting brush, a current-collecting ring, and a cover are omitted from a workpiece support device illustrated in FIG. 2 and a power cable is directly connected with a work table.

On the other hand, in the case of the non-continuous rotation application, since it is not necessary to rotate the work table 62, the power cable C for supplying electric power for arc-welding can be directly connected to the work table 62, as illustrated in FIG. 10.

In this case, the annular rear end face 98 and the current-collecting brush 58 that slidably contacts the rear end face 98 are not necessary. Accordingly, the cover 100 for sealing the rear end face 98 and the current-collecting brush 58 is also not necessary.

According to this embodiment, since the cover segments 112, 114, 116, 118 and 120 can be assembled and disassembled, it is possible to attach and remove the cover 100, depending on the application of the workpiece support device 50.

Accordingly, in the case of the non-continuous rotation application, the cover 100 and the current-collecting brush 58 can be removed to operate the workpiece support device 50. Due to this, it is possible to avoid the use of the current-collecting brush 58 in the non-continuous rotation application in which the current-collecting brush 58 is not necessary, and thereby preventing the current-collecting brush 58 or the rear end face 98 of the work table 62 from being unnecessarily worn.

Further, the current-collecting brush 58 and the cover 100, that are not necessary for the non-continuous rotation application, can be omitted, and thereby it is possible to construct the workpiece support device 50 from minimum components necessary for the non-continuous rotation application. As a result, the structure of the workpiece support device 50 for the non-continuous rotation application can be made compact, as illustrated in FIG. 10.

In the workpiece support device 50 illustrated in FIG. 10, the current-collecting brush 58, the current-collecting ring 80, and the cover 100 are removed, and the power cable C is directly connected to the table body 78 of the work table 62. The power cable C is connected to a power supply and directly supplies the electric power for arc-welding to the table body 78.

On the other hand, in the case of the continuous rotation application, the current-collecting brush 58 and the current-collecting ring are installed, and the cover segments 112, 114, 116, 118, and 120 are assembled so as to be attached to the base 52 as the cover 100, thereby, the current-collecting ring 80 and the rear end face 98 can be sealed. Therefore, it is possible to prevent the foreign matter from adhering to the current-collecting ring 80 and the rear end face 98.

Further, in this embodiment, the cover 100 includes the first group of cover segments 112 and 114 that can be divided in the circumferential direction and the second group of cover segments 116 and 118 that can be divided in the circumferential direction. According to this configuration, it is possible to disassemble the cover 100 in a state where the work table 62 is mounted to the base 52.

Further, in this embodiment, the first group of cover segments 112 and 114 and the second group of cover segments 116 and 118 can be divided in the axial direction. According to this configuration, it is possible to facilitate the work of disassembling the cover 100 in a state where the work table 62 is mounted to the base 52.

In this embodiment, each of the cover segments 112, 114, 116, 118, and 120 is an insulator. According to this configuration, the work table 62 and the base 52 can be electrically insulated.

In this embodiment, the current-collecting ring 80 includes the plurality of ring segments 92 aligned in the circumferential direction. According to this configuration, the current-collecting ring 80 can be easily disassembled and attached, depending on the application.

In this embodiment, the oil seal housing 106 can be attached to and detached from the cover 100 in the axial direction. According to this configuration, the oil seal housing 106 can be removed from the work table 62 in a state where the work table 62 is mounted to the base 52. Accordingly, it is possible to facilitate the work of changing the oil seal 108.

Figure 11:
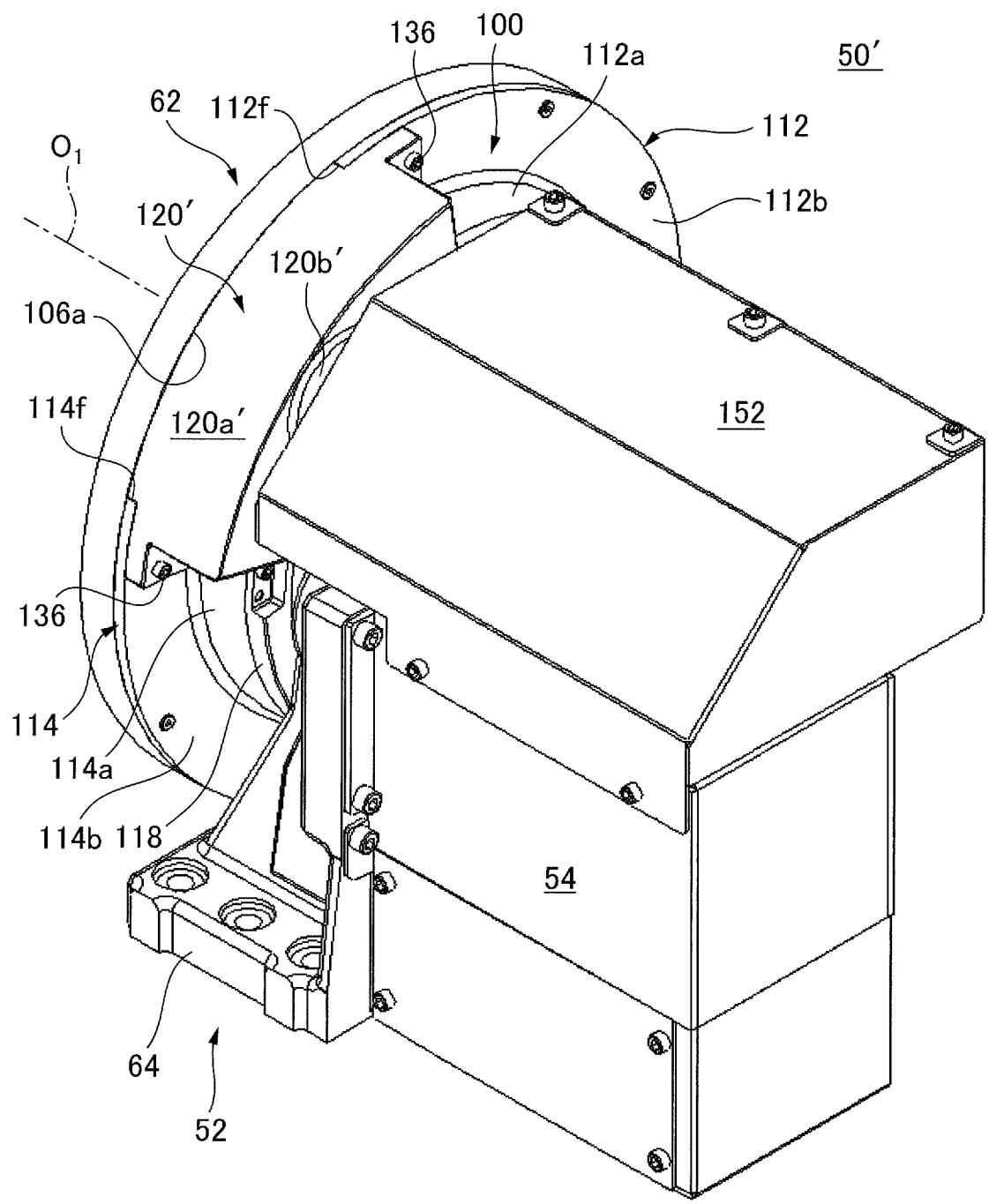
FIG. 11 is a perspective view of a workpiece support device according to another embodiment.
Figure 12:
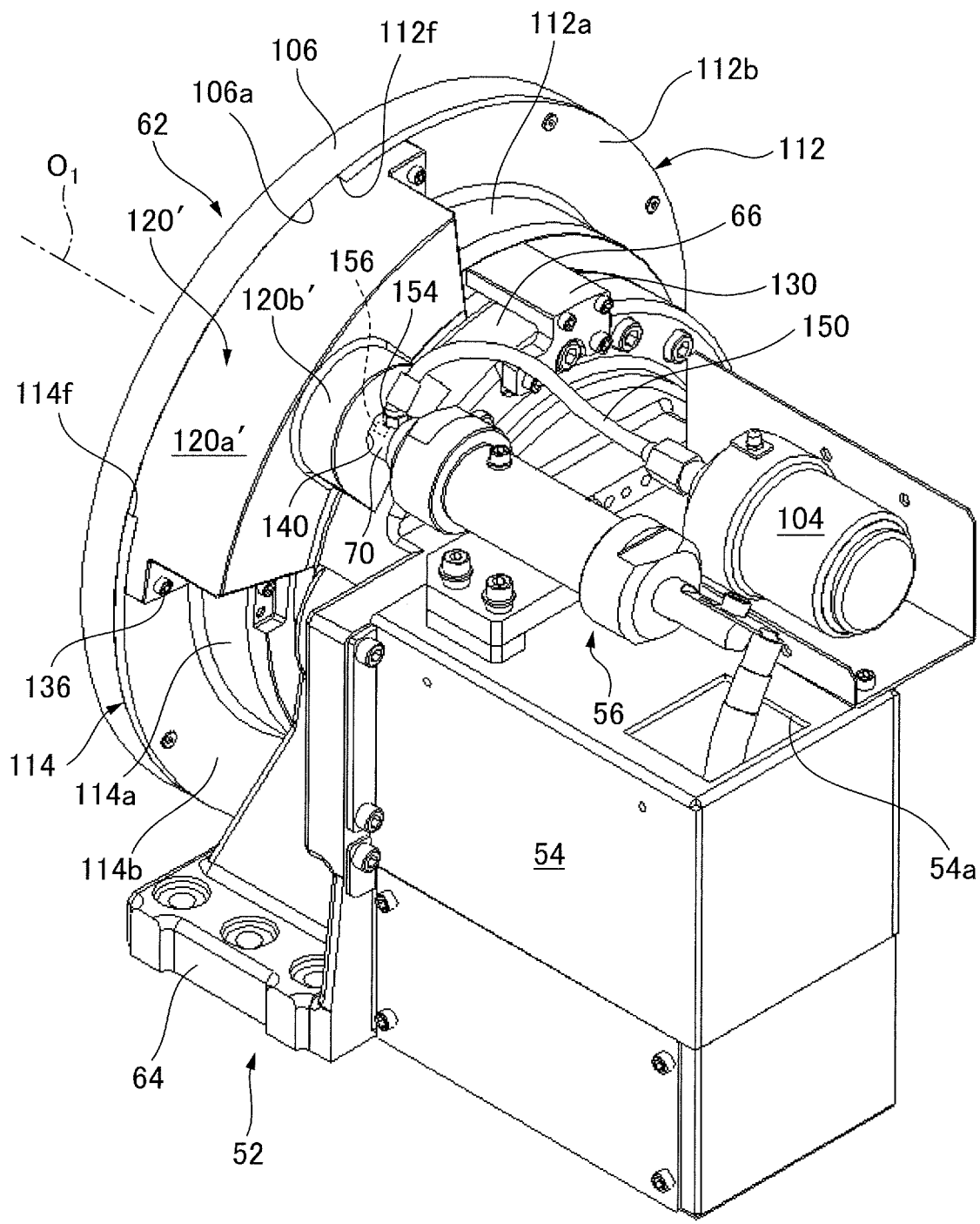
FIG. 12 is a perspective view obtained by omitting an insulation cover from a workpiece support device illustrated in FIG. 11.

Next, with reference to FIG. 11 and FIG. 12, a workpiece support device 50' according to another embodiment is described. The workpiece support device 50' differs from the above-described workpiece support device 50 in an insulation cover 152, a cover segment 120', and the attachment position of the grease cup 104.

The workpiece support device 50' includes the insulation cover 152. The insulation cover 152 is attached to the upper side of the motor housing 54, and covers the power supply mechanism 56 (specifically, second power supply shaft 70 and cylinder 72) and the grease cup 104. The insulation cover 152 prevents an operator from erroneously touching the second power supply shaft 70.

The cover segment 120' is a single monolithic member having a substantially sector outer shape as viewed from the y-axis direction, and arranged between the circumferential end 112f of the cover segment 112 and the circumferential end 114f of the cover segment 114, so as to cover the current-collecting brush 58 (FIG. 6) from the outside.

The cover segment 120' includes a first portion 120a' and a second portion 120b' integrally provided at the rear end of the first portion 120a'. One circumferential end of the first portion 120a' is removably connected to the flange wall 112b of the cover segment 112, and the other circumferential end of the first portion 120a' is removably connected to the flange wall 114b of the cover segment 114, by the fasteners 136.

The through hole 140 is formed at the rear end wall of the second portion 120b' so as to penetrate the rear end wall in the axial direction. The second power supply shaft 70 is inserted into the through hole 140.

The grease cup 104 is fixed upside of the motor housing 54. In this embodiment, the grease stored in the grease cup 104 is supplied to the internal space S (FIG. 5) of the current-collecting brush 58 through a pipe 150.

The pipe 150 extends from the grease cup 104 and is connected to a joint 154 provided at the outer circumference of the second power supply shaft 70. A communication hole 156 is formed inside of the second power supply shaft 70.

The communication hole 156 extends in the y-axis direction between the joint 154 and the internal space S of the current-collecting brush 58, and is in fluid communication with the internal space S of the current-collecting brush 58 at its front end, and with the inside of the pipe 150 via the joint 154 at its rear end.

The grease stored in the grease cup 104 flows through the pipe 150 and flows into the communication hole 156 via the joint 154. The grease flowing into the communication hole 156 flows forward in the communication hole 156, and is supplied to the internal space S of the current-collecting brush 58 so as to lubricate the contact surface between the current-collecting brush 58 and the rear end face 98 of the current-collecting ring 80.

Figure 13:
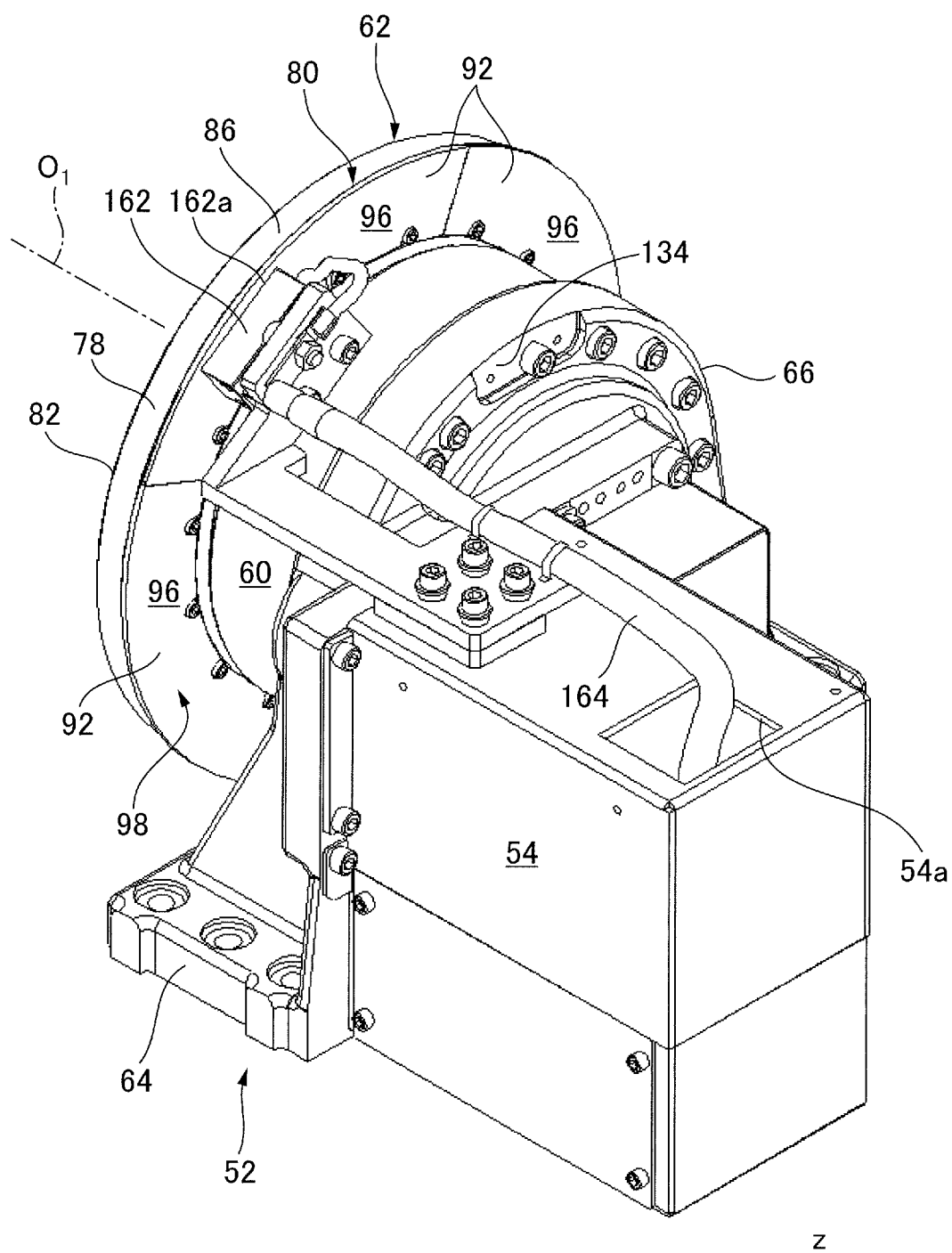
FIG. 13 is a perspective view of a workpiece support device according to still another embodiment.

Next, with reference to FIG. 13, a workpiece support device 160 according to still another embodiment is described. FIG. 13 is a perspective view corresponding to the above-described FIG. 6, wherein the cover 100 and the oil seal housing 106 are not shown for easy understanding.

The workpiece support device 160 differs from the workpiece support device 50' illustrated in FIG. 11 and FIG. 12 in the configuration, wherein the workpiece support device 160 includes a current-collecting brush 162 and a power supply cable 164, instead of the above-described current-collecting brush 58 and the power supply mechanism 56, while it does not include the above-described grease cup 104.

The power supply cable 164 is electrically connected to the terminal 75 (FIG. 3) at its one end, and is electrically connected to the current-collecting brush 162 at its the other end. The electric power supplied to the terminal 75 from the external power supply installed outside of the workpiece support device 160 is supplied to the current-collecting brush 162 via the power supply cable 164.

The current-collecting brush 162 is removably fixed with respect to the base 52. A front end 162a of the current-collecting brush 162 contacts the rear end face 98 of the current-collecting ring 80 so as to be relatively slidable thereon. Thus, the current-collecting brush 162 supplies the electric power to the work table 62. The above-described cover 100 is installed to cover the current-collecting brush 162 and the rear end face 98. Specifically, cover segments 112, 114, 116 and 118 cover the rear end face 98, and the cover segment 120' covers the current-collecting brush 162.

In this embodiment, the current-collecting brush 162 is configured from a conductive carbon (so-called, carbon brush). By configuring the current-collecting brush 162 from the carbon in this way, the friction between the current-collecting brush 162 and the rear end face 98 is reduced, and thereby it is not necessary to lubricate the current-collecting brush 162 and the rear end face 98 with the grease. Therefore, the above-described grease cup 104 can be omitted.

Further, since the conductivity between the current-collecting brush 162 and the rear end face 98 contacting each other is improved, it is not necessary to press the front end 162a of the current-collecting brush 162 against the rear end face 98. Therefore, the above-described spring 74 can be also omitted.

In the above-described embodiments, the total of four ring segments 92 are removably attached to the table body 78. However, only a part of the four ring segments 92 may be removable from the table body 78.

For example, in the embodiment illustrated in FIG. 6, only a first ring segment 92 of the four ring segments 92, which is arranged upper-right side, may be removable from the table body 78.

In this case, the first ring segment 92 may be arranged at a position corresponding to a start point and an end point of arc discharge. In the continuous rotation application, the circumferential position of the work table 62 and the current-collecting ring 80 corresponding to the start point and the end point of arc discharge (hereinafter, referred to as "arc discharge start point position", "arc discharge end point position") may be unchanged.

When the arc discharge start point position and the arc discharge end point position are arranged on the first ring segment 92, the arc discharge start point position and the arc discharge end point position on the first ring segment 92 are worn more rapidly, as the arc welding is repeated.

Accordingly, by configuring only the first ring segment 92 to be removable from the table body 78, only the first ring segment 92, which are to be more easily worn, can be appropriately exchanged. According to this configuration, it is possible to reduce a cost for a maintenance of the current-collecting ring 80.

On the other hand, a total of three ring segments 92 other than the first ring segment 92 are integrally fixed to the table body 78. In this case, these three ring segments 92 may be configured as a single monolithic annular member.

In the above-described embodiment, the first group of cover segments are configured from two cover segments 112 and 114 aligned in the circumferential direction. However, the first group of cover segments may be configured from a total of "n" cover segments aligned in the circumferential direction ("n" is an integer of 3 or more).

In the above-described embodiment, the second group of cover segments are configured from two cover segments 116 and 118 aligned in the circumferential direction. However, the second group of cover segments may be configured from a total of "n" cover segments aligned in the circumferential direction ("n" is an integer of 3 or more).

In the above-described embodiment, a single current-collecting brush 58 is provided. However, a plurality of current-collecting brushes may be provided. Such an embodiment is shown in FIG. 14.

Figure 14:
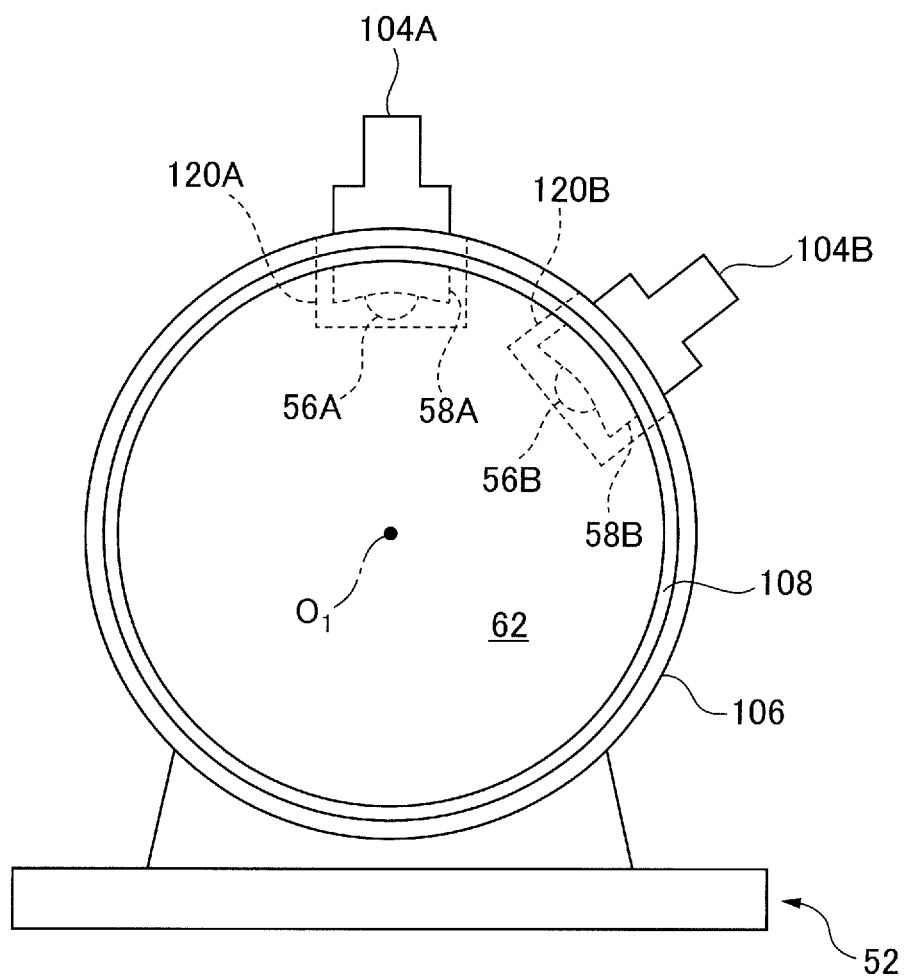
FIG. 14 is a front view of a workpiece support device according to still another embodiment.

A workpiece support device 50" illustrated in FIG. 14 differs from the above-described workpiece support device 50 in the configuration, wherein the workpiece support device 50" includes current-collecting brushes 58A and 58B, grease cups 104A and 104B, and power supply mechanisms 56A and 56B.

The current-collecting brushes 58A and 58B are arranged so as to align in the circumferential direction, and contact the rear end face 98 of the work table 62 (current-collecting ring 80) so as to be relatively slidable to supply the electric power to the work table 62.

In this case, the cover 100 includes the cover segment 120A that covers the current-collecting brush 58A and the cover segment 120B that covers the current-collecting brush 58B. Each of the cover segments 120A and 120B may have a configuration similar to that of the above-described cover segment 120. Further, the cover 100 includes an arc-shaped cover segment (not illustrated) that extends between the cover segments 120A and 120B.

Each of the grease cups 104A and 104B has a configuration similar to that of the above-described grease cup 104, and supply the grease respectively to the internal space S of the current-collecting brushes 58A and 58B. Further, each of the power supply mechanisms 56A and 56B has a configuration similar to that of the above-described power supply mechanism 56, and supply the electric power respectively to the current-collecting brushes 58A and 58B.

In this manner, by providing the plurality of current-collecting brushes 58A and 58B, even if a foreign matter enters between one current-collecting brush and the work table 62 (current-collecting ring 80), the other current-collecting brush can supply the electric power to the work table 62. Accordingly, it is possible to enhance the stability of power supply to the work table 62. Similarly, in the embodiment illustrated in FIG. 11 or FIG. 13, a plurality of current-collecting brushes 162A and 162B may be provided.

Further, the insulation cover 152 illustrated in FIG. 11 may be applied to the work table support device 50 illustrated in FIG. 1. The insulation cover 152 illustrated in FIG. 11 may be applied to the work table support device 160 illustrated in FIG. 13, wherein the insulation cover 152 may cover the power supply cable 164.

Although the present disclosure has been described above through the embodiments, the above-described embodiments do not limit the invention according to Claims.

The invention claimed is:

1. A workpiece support device comprising:
   a base;
   a conductive work table rotatably supported by the base, and having a first end face that supports a workpiece and a second end face opposite the first end face;
   a removable current-collecting brush fixed relative to the base, and slidably contacting the second end face to supply electric power to the work table; and
   a cover removably attached to the base and including a plurality of cover segments configured to be assembled and disassembled from one another, the plurality of cover segments including:
      a group of cover segments having an arc-shape and arranged so as to partially surround a current-collecting ring along a rotational axis of the work table such that a gap is formed between the group of cover segments, the current-collecting brush positioned in the gap to contact the current-collecting ring, and
      a brush cover segment arranged so as to cover the current-collecting brush positioned in the gap.

2. The workpiece support device according to claim 1, wherein the cover is configured to prevent a foreign matter from entering an inside of the cover.

3. A workpiece support device comprising:
   a base;
   a conductive work table rotatably supported by the base, and having a first end face that supports a workpiece and a second end face opposite the first end face;
   a removable current-collecting brush fixed relative to the base, and slidably contacting the second end face to supply electric power to the work table; and a cover removably attached to the base, and surrounding the current-collecting brush and the second end face, the cover including a plurality of cover segments configured to be assembled and disassembled from one another, wherein each of the plurality of cover segments is an insulator.

4. The workpiece support device according to claim 1, further comprising:

an oil seal housing arranged so as to surround an outside of the work table, and removably attached to the cover; and an oil seal interposed between the work table and the oil seal housing, and sealing a gap between the work table and the oil seal housing.

5. The workpiece support device according to claim 1, wherein the cover is formed with an opening that allows the current-collecting brush to be viewed from the outside of the cover, wherein the workpiece support device further comprises a lid removably attached to the cover and which closes the opening.

6. The workpiece support device according to claim 1, further comprising:

a reduction gear device including a hollow portion at its center, and which transmits rotation force to the work table; and a slip ring inserted in the hollow portion, and in which a flow pipe or a signal line is disposed.

7. A workpiece support device comprising:

a base;

a conductive work table rotatably supported by the base, and having a first end face that supports a workpiece and a second end face opposite the first end face;

a removable current-collecting brush fixed relative to the base, and slidably contacting the second end face to supply electric power to the work table; and a cover removably attached to the base, and surrounding the current-collecting brush and the second end face, the cover including a plurality of cover segments configured to be assembled and disassembled from one another, wherein the current-collecting brush includes a plurality of current-collecting brushes.

8. The workpiece support device according to claim 1, wherein the work table includes:

a table body having the first end face; and a current-collecting ring attached to the table body and having the second end face.

9. The workpiece support device according to claim 8, wherein the current-collecting ring includes a plurality of ring segments aligned around a rotational axis of the work table.

10. The workpiece support device according to claim 9, wherein at least one of the plurality of ring segments is removably attached to the table body.

11. The workpiece support device according to claim 1, wherein the plurality of cover segments includes a first group of cover segments arranged so as to align around a rotational axis of the work table, each of the first group of cover segments having an arc-shape.

12. The workpiece support device according to claim 11, wherein the plurality of cover segments includes a second group of cover segments arranged so as to be adjacent to the first group of cover segments and align around the rotational axis, each of the second group of cover segments having an arc-shape.

* * * * *